April 21, 1959
H. P. WICKHAM
2,883,332
CONVERSION PROCESS AND APPARATUS WITH PLURAL
STAGES AND INTERMEDIATE STRIPPING ZONE
Filed Oct. 31, 1956
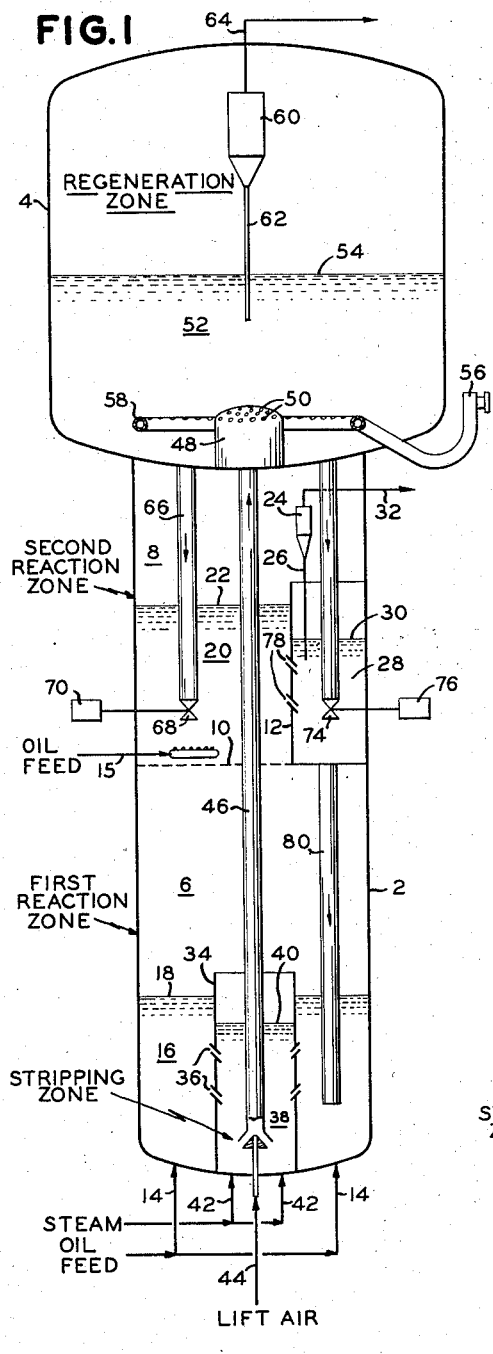
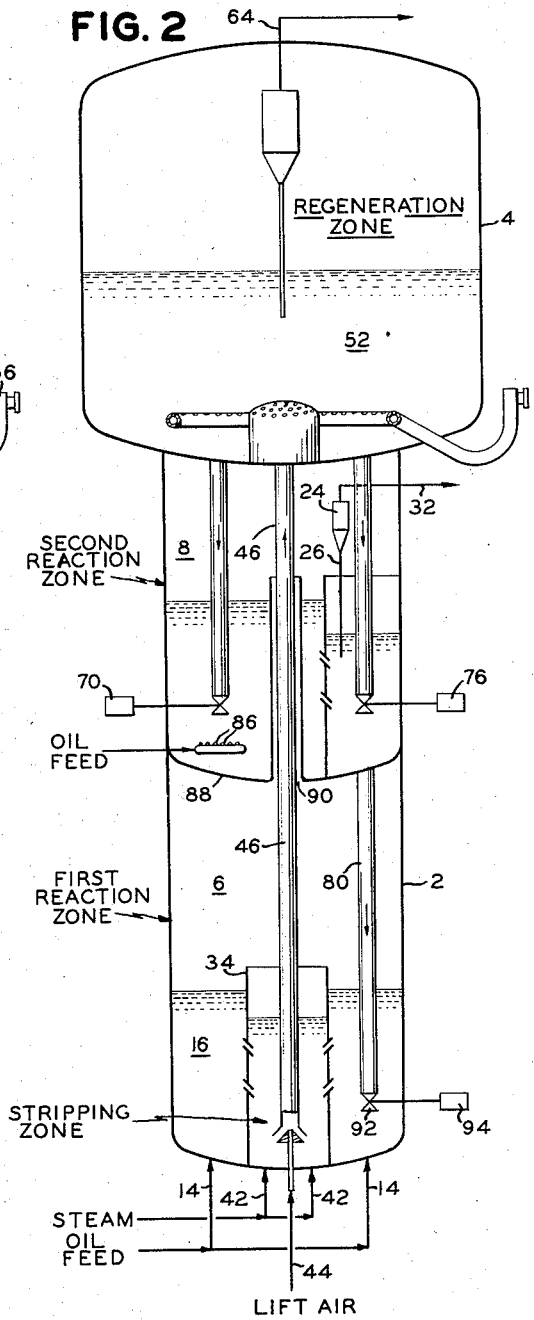
INVENTOR.
HENRY P. WICKHAM
BY
*J. D. Palmer*
ATTORNEY
*Carl D. Farnsworth*
AGENT United States Patent Office 2,883,332
Patented Apr. 21, 1959

2,883,332

CONVERSION PROCESS AND APPARATUS WITH PLURAL STAGES AND INTERMEDIATE STRIPPING ZONE

Henry P. Wickham, Glen Head, N.Y., assignor to The M. W. Kellogg Company, Jersey City, N.J., a corporation of Delaware Application October 31, 1956, Serial No. 619,571

11 Claims. (Cl. 208—74)

This invention relates to a conversion process and apparatus for conducting chemical reactions and more particularly it relates to a process and apparatus for catalytically cracking high boiling hydrocarbons to a high quality gasoline product.

It is conventional to use conversion apparatus of the type in which the regenerator is superimposed on the reactor; the advantages of this type of apparatus being disclosed in copending application Serial No. 464,476, filed October 25, 1954. In this type of apparatus, a gasiform chemical reactant is contacted with a dense fluidized bed of finely divided catalytic material in a reaction zone, whereby a reaction product is produced and the catalyst is contaminated with carbonaceous material. A portion of the contaminated catalyst is withdrawn from the reaction zone and passed upwardly, through a spent catalyst riser, as a suspension in an oxygen-containing gas, the quantity of oxygen-containing gas being about 10 to 40 percent by volume of the total gas required for regeneration of the catalyst. The spent catalyst is discharged from the riser into a regeneration zone which is in vertical alignment with the reaction zone.

A dense fluidized bed of catalyst is maintained in the regeneration zone and an oxygen-containing gas is passed therethrough in order to burn the carbonaceous material from the catalyst. The regenerated catalyst from the regeneration zone is then passed downwardly through a plurality of catalyst standpipes to the reaction zone, the standpipes being vertical and symmetrically arranged with respect to the spent catalyst riser thereby permitting free circulation of catalyst within the vessel.

In accordance with the present invention, a novel process and apparatus is provided in which a reactor, having a regenerator superimposed thereon and confined within a single vessel is divided into a plurality of conversion zones. In one embodiment of the invention, the reactor is divided into two conversion zones by a foraminous plate or grid. In this embodiment, oil feed may be charged to both conversion zones or to the first conversion zone alone, having a dense fluidized bed of catalytic material therein, and the conversion products from the first zone pass through the foraminous plate or grid separating the two zones into the second conversion zone mounted above the first zone, the passage of the conversion products through the grid assisting to maintain a dense bed of catalytic material in the second zone in a fluidized condition. The mixed conversion products from the conversion zones are then withdrawn therefrom through a suitable separating means, such as a cyclone separator.

Spent catalyst from the first conversion zone is passed to a stripping zone where it is stripped with a stripping gas such as steam and the stripped catalyst is then passed upwardly through a spent catalyst riser as a relatively dilute suspension in an oxygen-containing gas such as air to the regeneration zone. Partial regeneration of the catalyst may be accomplished in the spent catalyst riser. The catalyst is discharged from the spent catalyst riser into a distributing means which serves to distribute the catalyst throughout a dense fluidized bed of catalyst undergoing regeneration in the regeneration zone. The regenerated catalyst is transferred from the regeneration zone to the second reaction zone by means of a plurality of regenerated catalyst standpipes.

Adjacent to the second reaction zone is a catalyst well or stripping zone into which spent catalyst from the second reaction zone is transferred through louvered slots in the wall of the well. The catalyst may be stripped, if desired, with a suitable stripping gas prior to being passed to the first reaction zone. A catalyst standpipe connects the catalyst well with the dense fluidized bed of catalyst in the first reaction zone and a regenerated catalyst standpipe extends into the catalyst well from the regeneration zone, so that, in addition to the passage of partially spent catalyst from the second reaction zone into the well, there may be a transfer of freshly regenerated catalyst from the regeneration zone to the well and then to the fluidized catalyst bed in the first reaction zone thereby providing greater flexibility of operation with respect to catalyst activity and temperature. That is, the reaction temperature may be the same or different in the respective reaction zones as desired.

In a second embodiment of the present invention, a unitary vessel with a reactor section in the lower portion and a regenerator superimposed thereon is provided wherein the reactor section is divided into separate reactor compartments, in order that two different feed stocks may be simultaneously converted at the same or different temperatures or, alternatively, the same feed stock may be treated at two different temperatures. In this embodiment, feed is introduced into the dense phase of a fluidized bed of catalytic material in a first reaction zone while the same or a different feed is introduced into the dense phase of a fluidized bed of catalytic material in a second reaction zone, which is located above and in vertical alignment with the first reaction zone. A spent catalyst riser extends substantially vertical from a point near the bottom or lower portion of the first reaction zone through the second reaction zone and discharges into a distributing vessel mounted in the lower portion of the regeneration zone. The second reaction zone positioned above the first reaction zone is provided with a centrally located cylindrical sleeve surrounding and concentrically positioned with respect to the spent catalyst riser passing through said second reaction zone thereby forming an annular space between the sleeve and the riser. Conversion products from the first reaction zone pass through this annular space and are discharged into the dilute catalyst phase above the dense fluidized catalyst bed in the second reaction zone where they are mixed with the conversion products from the second reaction zone, and the mixed products pass through a suitable separation means such as a cyclone separator for the removal of entrained particles from the reaction products which are discharged from the second reaction zone to suitable product recovery equipment.

Spent catalyst from the first reaction zone is transferred to a stripping zone concentrically located within the first reaction zone. From the stripping zone the spent or contaminated catalyst is conveyed upwardly through the spent catalyst riser by means of an oxygen-containing gas and distributed throughout the fluidized bed of catalyst undergoing regeneration in the regenerator. Regenerated catalyst from the regenerator is transferred through one or more standpipes to the second reaction zone or well adjacent thereto as previously described thereby completing the cycle flow of catalyst through the vessel.

In the present invention, about 50 to 100 cubic feet of oxygen-containing gas, measured at standard conditions, per pound of catalyst being circulated are required for regeneration of the catalyst. The catalyst to oil ratio on a weight basis is in the range of between about 5 to about 15. The superficial linear velocity of upflowing material in the spent catalyst riser may be between about 15 and about 50 feet per second. In a preferred embodiment, the quantity of oxygen-containing gas which is passed upwardly through the spent catalyst riser constitutes about 25 volume percent of the total regeneration gas and the linear velocity within the riser is about 30 feet per second. These conditions, however, may be varied considerably depending on the extent of catalyst regeneration desired in the riser and catalyst circulation rate.

The feed to the reactor for a catalytic cracking operation may be a high boiling hydrocarbon oil having an initial boiling point of about 400 to about 650° F. and an end point of about 700 to about 1300° F. The API gravity of the high boiling hydrocarbons may be in the range of about 10 to about 40°; the hydrocarbons being, for example, gas oils, reduced crudes, vacuum distillates, solvent decarbonized residual oils, and the like. The hydrocarbons are cracked at a temperature of about 850 to about 1000° F. at a pressure of about 1 atmosphere to about 50 p.s.i.g., preferably from about 5 to 25 p.s.i.g. The weight space velocity may be between about 0.25 and about 15, preferably about 0.5 to 5.

Among the cracking catalysts which may be used are siliceous materials containing about 50 to 100 percent by weight of silica preferably about 70 to 90 percent by weight with the remainder being another catalytic material such as alumina, zirconia, boria, magnesia, and the like or combinations thereof such as; silica-alumina, silica-alumina-boria, silica-alumina-magnesia, etc.

The temperature of regeneration may be between about 700 to about 1200° F., preferably about 1000 to 1150° F. The regeneration pressure may be in the same range as the reaction pressure, the regeneration being effected by the introduction of an oxygen-containing gas such as air or a diluted air stream into the lower portion of the regeneration zone.

The spent catalyst withdrawn from the first reaction zone is subjected to a stripping treatment by means of a gasiform stripping agent introduced to the lower portion of the stripping zone such as steam, hydrogen, methane, ethane or propane and the like, before the regeneration treatment. The stripping is effected in the vertical cylindrical vessel positioned concentrically about the spent catalyst riser as previously described and the spent catalyst is transferred to the stripper through louvers or slots in the stripper wall or by flow of the spent catalyst over the stripper wall. The stripping treatment removes occluded volatile materials from the catalyst and is effected at a temperature of about 800 to 1000° F., preferably about 875 to 950° F. As previously stated, it is also contemplated within the scope of this invention to effect stripping of the catalyst in the well adjacent to the second reaction zone, prior to passing the catalyst to the first reaction zone.

In this system, the regenerator has a diameter of about the same to two times greater than the reactor and both vessels, depending on size, have a length to diameter ratio of about 1 to 10. The regenerated catalyst is transferred from the regenerator to the second reaction zone through one or more vertical standpipes, the number depending upon the quantity of catalyst it is desired to circulate. One or more standpipes may also be used for transferring catalyst from the second reaction zone to the first reaction zone.

Referring now to the accompanying drawings in which preferred embodiments of the present invention are shown:

Figure 1 is a diagrammatic illustration in elevation of an apparatus in which the first and second stage reaction zones are separated by a foraminous partition such that reaction products from the first conversion zone pass through the catalyst in the second reaction zone.

Figure 2 is a diagrammatic illustration in elevation of an apparatus divided into two conversion zones in which the same or different feed stocks may be converted at the same or different temperatures with the catalyst from the second conversion zone being passed to the first conversion zone.

Referring to Figure 1, a vessel 2 having regenerator 4 located in the upper portion thereof with the lower portion of vessel 2 being divided into a lower compartment 6 and an upper compartment 8 by a foraminous plate or grid 10. The foraminous plate or grid 10, extends completely across the reactor to the wall 12 of a catalyst well or stripping zone which is provided in the upper compartment 8.

The lower compartment 6 is provided with a plurality of feed inlet nozzles 14 by means of which oil feed is introduced into the fluidized bed of catalytic material 16 in the lower compartment 6, the fluidized bed having a level 18. Vaporous or gaseous conversion products from the lower compartment 6 pass through the foraminous plate or grid 10 into a fluidized bed of catalytic material 20 in the upper compartment 8, the fluidized bed having a level 22. Additional hydrocarbon feed of the same or different boiling range as that employed in the first reaction zone may be added to the lower portion of catalyst bed 20 through feed inlet 15. The mixed reaction products from compartments 6 and 8, together with any entrained finely divided material, pass into the cyclone 24 in which the entrained material is separated and returned through the dipleg 26 to the catalyst bed 28 in the catalyst well, the bed 28 having the level 30. The catalyst in bed 28 may be stripped by means not shown prior to entering the first reaction zone. Mixed products of reaction are withdrawn through the line 32 and passed to suitable recovery equipment, not shown.

Spent or contaminated catalyst from the fluidized bed 16 in the lower conversion zone 6 is transferred into the stripper 34 through a plurality of louvers or slots 36 in the stripper wall. A bed of catalyst 38 in the stripper 34 having a level 40, is then stripped with a stripping gas such as steam which is introduced to the lower portion of the stripper through the nozzles 42.

Air or other oxygen-containing gas introduced through the plug valve 44 carries stripped catalyst from the lower portion of bed 38 upwardly through the spent catalyst riser 46 into the distributing vessel 48, having a plurality of apertures 50 therein for the distribution of the catalyst into the lower portion of the fluidized bed of catalyst 52, having an upper level 54, in the regeneration zone 4. Partial regeneration of the catalyst is accomplished in riser 46 as the catalyst is transferred upwardly therethrough. Additional regeneration gas is introduced into the regenerator through line 56 which connects to the distribution ring 58. A mixture of flue gases and any entrained finely divided material passes to the cyclone separator 60 in which entrained material is separated and returned to the catalyst bed 52 through dipleg 62. Flue gases are withdrawn from the regenerator through the line 64.

Regenerated catalyst is withdrawn from the bed 52 and is passed downwardly through standpipe 66 to the fluidized catalyst bed 20 in the upper compartment 8 or second reaction zone. The flow of catalyst through the standpipe 66 may be regulated by means of control valve 68, having either a manual or automatic control means 70.

A standpipe 72 connects the lower portion of regenerator 4 with the bed of catalyst 28 in the catalyst well adjacent to the second conversion zone, with the flow of catalyst through this standpipe being regulated by means of control valve 74 having manual or automatic control means 76. The catalyst is transferred from the fluidized bed 20 in the second reaction zone 8 into the catalyst bed 28 in the well or stripper adjacent thereto through one or more louvers or slots 78 in the wall 12 forming the well. Catalyst is transferred from the well into the dense fluidized bed 16 in the lower or first reaction zone through the standpipe 80 which may or may not be provided with a control valve at the lower end thereof.

The embodiment in Figure 2 of the drawing differs from that of Figure 1, in that, the bottom of the upper compartment or second reaction zone 8 is provided with a sleeve 82 which surrounds and is concentrically positioned with respect to the spent catalyst riser 46 thereby forming an annular space between conduit or riser 46 and cylindrical sleeve 82. In this embodiment, reaction products of the first reaction zone do not pass through the catalyst in the second reaction zone but pass through the annular space previously discussed prior to mixing with the products of the second reaction zone. A feed stock is introduced into the lower portion of the first reaction zone through nozzles 14 and a second feed stock, which may be the same or different than the first feed stock, is introduced into the lower portion of the second reaction zone through line 84 terminating in spray nozzles 86. The bottom of the upper compartment or second reaction zone is a solid member as shown at 88 and may be hemispherical in shape, if desired.

In the embodiment of Figure 2, the products of reaction from the lower compartment or first reaction zone 6 pass through the annular space, formed by the central sleeve 82 in the upper compartment or second reaction zone and the spent catalyst riser 46, as shown by the arrows 90, the conversion products being discharged into the dilute catalyst phase above the catalyst bed in the upper compartment or second reaction zone 8. From the dilute phase, the mixed reaction products together with any stripped products of reaction from each stripping zone pass through the cyclone 24 together with an entrained finely divided contact material, the material being separated therein and returned to the bed 28 in the catalyst well through dipleg 26 while the combined conversion products are discharged from the upper compartment or second reaction zone through conduit 32.

The embodiment of Figure 2 also differs from Figure 1, in that the standpipe 80, which connects the catalyst well with the fluidized bed 16 in the first reaction zone is provided with a control valve 92 at the bottom thereof having a manual or automatic control means 94. However, the use of the control valve 92 is optional.

The invention will be further illustrated by the following specific examples which present the comparison of product distribution and quality obtained when fluid catalytic cracking segregated and blended feed stocks.

Five Eastern Venezuelan oils were catalytically cracked to obtain the data presented hereinbelow. A 51% residuum was topped to yield a 25° API heavy gas oil (nominal position in crude 49.0 to 72.4%), and the reduced crude from the topping unit was propane decarbonized to yield deasphalted oils boiling below 6.8 and 4.8% asphalts. The heavy gas oil and the two deasphalted oils were cracked in separate experiments, as were the two blends of the heavy gas oil and the deasphalted oils. The inspections and the position in crude of each of the charge stocks are presented in Table II. All of the cracking operations were carried out at 950° F. over synthetic catalyst, with conversions of the oil ranging from 57 to 61%. For the following comparisons, the data were adjusted to constant operating conditions, for example, 950° F. reactor temperature, 10 catalyst to oil ratio, 0.5% carbon on regenerated catalyst, 10 p.s.i.g. reactor pressure, and 10% process steam.

In Table I, the summary of the adjusted data for each of the five types of reactor charged stocks is presented. The product distribution and inspections when cracking the heavy gas oil above are tabulated in column 1, for the deasphalted oils alone in columns 2 and 5, and for the aliquot blends of heavy gas oil and deasphalted oils in columns 4 and 7. Columns 3 and 6 present the summation of the results obtained when cracking the segregated feeds, these results being directly comparable with those obtained when cracking the blends.

Cracking the segregated feeds resulted in essentially the same production of coke and butanes, 0.6–0.8% lower dry gas yields, and 0.7–0.8% higher yields of debutanized motor gasoline than obtained when cracking the blends. The olefin contents of the ethanes, propanes, butanes and gasoline were lower for the segregated feeds, while the aromatic contents of the gasoline were the same or slightly lower. A 0.3–0.6 number advantage in both the ASTM and CFRR clear octane was shown for the operation on the segregated feed stocks. Furnace oil yields (90% at 600° F.) from the segregated feed operations were 1–2% higher. It is concluded therefore that there is a distinct advantage in product distribution and quality for operation with segregated feeds over blended feeds.

Accordingly, it is contemplated within the scope of the present invention to employ a recycle stock as a feed to either reaction zone as well as to use different conditions of operation in each of the respective reaction zones to effect the desired conversion of the hydrocarbon material fed thereto. That is to say, a recycle stock may be introduced to one of the reaction zones wherein the temperature conditions of operation are adjusted to effect the desired conversion with the fresh feed employed in the other reaction zone under selected cracking conditions.

Tables I and II are presented below.

TABLE I

*Kellogg fluid catalyst cracking—Eastern Venezuela heavy oils—synthetic catalyst*

SUMMARY OF EFFECTS OF SEGREGATING VERSUS BLENDING FEEDS

| Run Number | 1 | 2 | Calc. | 3 | 4 | Calc. | 5 |
|---|---|---|---|---|---|---|---|
| Feed Composition: | | | | | | | |
| 27.1° API Gas Oil—Vol. Percent | 100.0 | | 52.9 | 52.9 | | 50.6 | 50.6 |
| 21.8° API Deasphalted Oil—Vol. Percent | | 100.0 | 47.1 | 47.1 | | | |
| 20.9° API Deasphalted Oil—Vol. Percent | | | | | 100.0 | 49.4 | 49.4 |
| 27.1° API Gas Oil—Wt. Percent | 100.0 | | 52.0 | 52.0 | | 49.6 | 49.6 |
| 21.8° API Deasphalted Oil—Wt. Percent | | 100.0 | 48.0 | 48.0 | | | |
| 20.9° API Deasphalted Oil—Wt. Percent | | | | | 100.0 | 50.4 | 50.4 |
| Charge Stock | | | Segregated | Blended | | Segregated | Blended |
| Catalyst: | | | | | | | |
| Activity Rating | 36 | 36 | 36 | 36 | 36 | 36 | 36 |
| Carbon Factor | 1.4 | 1.4 | 1.4 | 1.4 | 1.4 | 1.4 | 1.4 |
| Gas Volume Factor | 1.7 | 1.7 | 1.7 | 1.7 | 1.7 | 1.7 | 1.7 |
| Operating Conditions: | | | | | | | |
| Temperature—° F | 950 | 950 | 950 | 950 | 950 | 950 | 950 |
| Pressure—p.s.i.g. | 10 | 10 | 10 | 10 | 10 | 10 | 10 |
| Catalyst/Oil—Weight | 10 | 10 | 10 | 10 | 10 | 10 | 10 |
| Wt. Oil/Hr./Wt. Cat. Bed | 2.5 | 13.5 | | 4.3 | 12.1 | | 7.1 |
| Severity Factor | 4.0 | 0.74 | | 2.3 | 0.83 | | 1.4 |
| Steam—Wt. Percent to Reactor | 10 | 10 | 10 | 10 | 10 | 10 | 10 |
| Carbon on Spent Cat.—Wt. Percent | 0.98 | 1.06 | | 1.03 | 1.16 | | 1.08 |
| Carbon on Regen. Cat.—Wt. Percent | 0.50 | 0.50 | 0.50 | 0.50 | 0.50 | 0.50 | 0.50 |
| Conversion (400° F., EP)—Vol. Percent | 57.5 | 57.5 | 57.5 | 57.5 | 57.5 | 57.5 | 57.5 |
| Product Yields: | | | | | | | |
| Coke (90% Carbon)—Wt. Percent | 4.8 | 5.6 | 5.2 | 5.3 | 6.6 | 5.7 | 5.8 |
| Dry Gas—Wt. Percent | 8.8 | 6.4 | 7.7 | 8.3 | 6.7 | 7.5 | 8.3 |
| Dry Gas—c.f.p.b | 387 | 304 | 348 | 382 | 349 | 368 | 387 |
| Hydrogen | 73 | 63 | 68 | 70 | 88 | 80 | 75 |
| Methane | 85 | 65 | 76 | 92 | 78 | 81 | 93 |
| Ethanes | 62 | 60 | 61 | 72 | 69 | 66 | 73 |
| Propanes | 167 | 116 | 143 | 148 | 114 | 141 | 146 |
| Butene-Butane Fraction—Vol. Percent | 13.9 | 9.5 | 11.8 | 12.0 | 9.0 | 11.5 | 11.6 |
| Butenes—Vol. Percent | 7.5 | 6.8 | 7.2 | 7.7 | 6.8 | 7.2 | 7.4 |
| Debut. Motor Gasoline (400° F., EP)—Vol. Percent | 39.2 | 46.7 | 42.7 | 42.0 | 46.2 | 42.6 | 41.8 |
| Total Cycle Oil—Vol. Percent | 42.5 | 42.5 | 42.5 | 42.5 | 42.5 | 42.5 | 42.5 |
| Furnace Oil (90% at 600° F.)—Vol. Percent | 27.1 | 20.6 | 24.0 | 22.1 | 18.8 | 23.0 | 22.3 |
| Residual Fuel Oil—Vol. Percent | 15.4 | 21.9 | 18.5 | 20.4 | 23.7 | 19.5 | 20.2 |
| Liquid Recovery (Incl. C4)—Vol. Percent | 95.6 | 98.7 | 97.0 | 96.5 | 97.7 | 96.6 | 95.9 |
| Product Inspections: | | | | | | | |
| Ethylene in Ethanes—Vol. Percent | 43 | 42 | 43 | 41 | 35 | 39 | 42 |
| Propylene in Propanes—Vol. Percent | 70 | 76 | 72 | 73 | 72 | 71 | 73 |
| Butenes in Butanes—Vol. Percent | 54 | 72 | 61 | 64 | 75 | 63 | 64 |
| Debutanized Motor Gasoline— | | | | | | | |
| Gravity—° API | 56.0 | 55.9 | 56.0 | 56.3 | 55.7 | 55.8 | 55.5 |
| Olefins—Mol Percent | 47 | 71 | 59 | 60 | 72 | 60 | 61 |
| Aromatics—Vol. Percent | 20 | 8 | 14 | 17 | 8 | 14 | 14 |
| Octane Numbers: | | | | | | | |
| ASTM—Clear | 81.6 | 80.0 | 80.8 | 80.3 | 79.9 | 80.6 | 80.2 |
| ASTM+1.5 cc. TEL | 84.1 | 81.9 | 83.0 | 82.1 | 81.7 | 82.8 | 82.0 |
| CFRR—Clear | 95.5 | 94.0 | 94.8 | 94.5 | 93.5 | 94.4 | 93.8 |
| CFRR+1.5 cc. TEL | 97.5 | 95.9 | 96.7 | 96.5 | 95.2 | 96.2 | 95.9 |
| Total Cycle Oils—API Gravity | 22.7 | 18.2 | 20.5 | 21.4 | 18.4 | 20.5 | 20.6 |

TABLE II

*Kellogg fluid catalyst cracking—Eastern Venezuela heavy gas oil and deasphalted oils—synthetic catalyst*

FEED INSPECTIONS

| Feed | Heavy Gas Oil | Deas. Oil A | Deas. Oil B | Blend A | Blend B |
|---|---|---|---|---|---|
| Composition—Vol. Percent: | | | | | |
| Heavy Gas Oil | 100 | | | 52.9 | 50.6 |
| Deasphalted Oil A | | 100 | | 47.1 | |
| Deasphalted Oil B | | | 100 | | 49.4 |
| Total | | | | 100.0 | 100.0 |
| Vol. percent on Crude | 23.4 | 20.8 | 22.8 | 44.2 | 46.2 |
| Position in Crude—Vol. percent | 49–72 | 72–93 | 72–95 | 49–93 | 49–95 |
| Gravity—° API | 27.1 | 21.8 | 20.9 | 24.6 | 23.9 |
| Distillation [1]— | | | | | |
| IBP—° F | 390 | 638 | 542 | 450 | 455 |
| 5% | 525 | 677 | 675 | 540 | 555 |
| 10% | 555 | 723 | 745 | 580 | 595 |
| 20% | 600 | 782 | 806 | 633 | 648 |
| 30% | 625 | 818 | 844 | 680 | 698 |
| 40% | 655 | 865 | 888 | 720 | 728 |
| 50% | 685 | 908 | 923 | 775 | 782 |
| 60% | 703 | 940 | 955 | 830 | 832 |
| 70% | 748 | | | 885 | 898 |
| 80% | 790 | | | 955 | |
| 90% | 850 | | | | |
| 95% | 920 | | | | |
| Sulfur—Wt. percent | 1.0 | 1.3 | 1.4 | 1.15 | 1.2 |
| Carbon Residue—Wt. percent | 0.1 | 1.6 | 2.4 | 0.9 | 1.2 |
| ASTM Pour (Max.)—° F | 75 | 105 | 100 | 85 | 85 |
| Aniline Point—° F | 174 | 198 | 199 | 187 | 189 |

[1] 10 mm. vac. Hg corrected for stem emergence and to 760 mm.

Various modifications and alterations of the process and apparatus of this invention may become apparent to those skilled in the art without departing from the scope of this invention.

Having thus described my invention, I claim:

1. A process for converting a chemical reactant with finely divided contact material in a plurality of zones containing a lower first reaction zone, an intermediate second reaction zone and an upper regeneration zone which comprises passing a chemical reactant into said first reaction zone in contact with fluidized contact material to effect a desired conversion thereby contaminating the contact material, separating products of reaction from said contact material in said first reaction zone, passing separated conversion products of said first reaction zone upwardly through a dense fluidized bed of finely divided contact material maintained in said second reaction zone, passing a chemical reactant into the lower portion of said second reaction zone in addition to the products from said first reaction zone, effecting the desired conversion in said second reaction zone thereby contaminating the contact material, separating products of reaction from said second reaction zone, separating contaminated contact material from said second reaction zone and passing the same to a stripping zone, passing freshly regenerated contact material to said stripping zone, stripping said contaminated contact material in the presence of said freshly regenerated contact material in said stripping zone, passing stripped contact material commingled with regenerated contact material to the lower portion of said first reaction zone, separating contaminated contact material from said first reaction zone and passing the same to said regeneration zone.

2. A method for effecting the conversion of a hydrocarbon reactant in the presence of finely divided fluidized catalytic material which comprises passing said hydrocarbon reactant in contact with a first fluidized bed of finely divided catalytic material in a first reaction zone to effect a desired conversion thereby contaminating the catalyst with products of reaction, separating contaminated catalyst from said first fluid bed and passing the same to a regeneration zone, regenerating catalyst in said regeneration zone, passing a portion of said regenerated catalyst to a second dense fluid bed of catalyst in a second reaction zone, passing a hydrocarbon reactant in contact with said second catalyst bed to effect a desired conversion thereby contaminating the catalyst with products of reaction, passing all of the contaminated catalyst withdrawn from said second catalyst bed to a stripping zone, passing a portion of regenerated catalyst to said stripping zone, stripping contaminated catalyst of reaction products in the presence of regenerated catalyst in said stripping zone, passing stripped catalyst admixed with regenerated catalyst from said stripping zone to said first reaction zone, commingling products of said first and second reaction zones in the upper portion of said second reaction zone above the dense fluidized bed of catalyst therein and removing commingled products from the upper portion of said second reaction zone.

3. A catalytic cracking process which comprises passing a hydrocarbon reactant separately into a first and a second conversion zone each of said zones containing a fluidized bed of catalytic material to effect a desired conversion thereby contaminating the catalyst with products of reaction, commingling the products of reaction from the first conversion zone with the reaction products of said second conversion zone above the bed of catalytic material in said second conversion zone, separating commingled reaction products from said second conversion zone, passing contaminated catalyst from said first conversion zone to a regeneration zone, passing catalyst from said regeneration zone to said second conversion zone, passing contaminated catalyst from said second conversion zone to a stripping zone, stripping catalyst in said stripping zone in the presence of freshly regenerated catalyst passed thereto from said regeneration zone and passing catalyst from said stripping zone to said first conversion zone.

4. A conversion process which comprises passing a hydrocarbon reactant in contact with a fluidized bed of catalyst in a first and a second conversion zone to effect a desired conversion thereby contaminating the catalyst with products of reaction, passing contaminated catalyst from said first conversion zone to a first stripping zone, stripping catalyst in said first stripping zone, passing stripped catalyst from said first stripping zone upwardly as a confined stream through said second conversion zone to a regeneration zone, regenerating catalyst in said regeneration zone, passing a portion of the regenerated catalyst from said regeneration zone downwardly as a confined stream to said fluidized bed of catalyst in said second conversion zone, passing contaminated catalyst from said second conversion zone to a second stripping zone, passing a portion of freshly regenerated catalyst downwardly as a confined stream to said stripping zone, effecting stripping of said contaminated catalyst in said second stripping zone in the presence of freshly regenerated catalyst, said first and second stripping zones being in open communication in the upper portion with the upper portion of said second conversion zone above the dense bed of catalyst therein, passing catalyst from said second stripping zone to said first conversion zone and withdrawing reaction products of said first and second conversion zones from the upper portion of said second conversion zone.

5. A process for cracking hydrocarbons which comprises contacting freshly regenerated catalyst particles in a fluidized condition with a low-boiling hydrocarbon oil fraction under cracking conditions in a first reaction zone, separating products of reaction from the catalyst in said first reaction zone, withdrawing contaminated catalyst from said first reaction zone and passing the same to a stripping zone, passing freshly regenerated catalyst to said stripping zone, stripping contaminated catalyst in the presence of freshly regenerated catalyst in said stripping zone, withdrawing catalyst from said stripping zone and passing the same to a second reaction zone, passing a high boiling hydrocarbon oil fraction in contact with said catalyst in said second reaction zone under cracking conditions, separating products of reaction from the catalyst in said second reaction zone and commingling the same with the products of reaction of said first reaction zone, withdrawing contaminated catalyst from said second reaction zone and passing the same upwardly as a confined stream through said first reaction zone to a regeneration zone, regenerating catalyst in said regeneration zone and passing freshly regenerated catalyst downwardly as separate confined streams to said first reaction zone and said stripping zone.

6. A catalytic cracking process which comprises passing a hydrocarbon into a first conversion zone containing a fluidized bed of cracking catalyst therein to produce cracked reaction products, introducing the cracked products of reaction from the first conversion zone to the lower portion of a second conversion zone having a fluidized bed of finely divided catalytic material therein as a plurality of separate confined streams, passing an additional hydrocarbon reactant to the lower portion of said second conversion zone for conversion into desired products in the presence of products from said first conversion zone, withdrawing combined reaction products of said first and second conversion zones from the upper portion of said second zone, passing catalytic material from the second zone to a stripping zone, passing freshly regenerated catalyst to said stripping zone, passing catalyst from the stripping zone to said first conversion zone, passing catalyst from the lower portion of said first zone substantially vertically upwardly as a confined stream to a regenerating zone above the second zone and passing regenerated catalytic material to the second conversion zone.

7. A conversion process which comprises passing a chemical reactant into a first and second conversion zone, said conversion zones containing a dense fluidized bed of finely divided catalytic material therein, passing the reaction products from the first conversion zone upwardly through said fluidized bed of finely divided catalytic material in said second conversion zone as a separate confined stream to the upper portion of said second conversion zone, withdrawing combined reaction products from the upper portion of said second zone, passing catalytic material from said second conversion zone to an adjacent stripping zone, passing stripped catalyst admixed with regenerated catalyst downwardly as a confined stream from the stripping zone to the lower portion of the first zone, passing contaminated catalyst from the lower portion of said first zone upwardly as a confined stream through said second zone to the lower portion of a regenerating zone, and passing regenerated catalytic material from the regenerating zone to the second zone and the stripping zone.

8. A conversion process which comprises passing a chemical reactant into a first conversion zone containing a fluidized bed of finely divided catalytic material, passing a chemical reactant into a second conversion zone containing a fluidized bed of finely divided catalytic material, commingling the reaction products from the first conversion zone with the reaction products from the second conversion zone in the dilute phase of the second reaction zone, withdrawing the combined reaction products from the second zone, passing all of the catalytic material withdrawn from the second zone to a first stripping zone, stripping the catalyst in the stripping zone, passing stripped catalyst to the first zone, passing catalyst from the first zone to a second stripping zone, said first and second stripping zones in open communication with the dilute phase of said second zone, passing catalyst material from the second stripping zone to a regenerating zone, and passing regenerated catalytic material from the regenerating zone to said second conversion zone and said first stripping zone.

9. A unitary vessel comprising in combination a lower reaction chamber and an upper regenerator chamber, baffle means dividing the reaction chamber into an upper and a lower compartment, each of said compartments containing a dense fluidized bed of finely divided solid material in the lower portion thereof, means for introducing a chemical reactant into the lower portion of said lower compartment in contact with said fluidized bed of finely divided solid material, means for passing the reaction products from the lower compartment through said baffle means into the upper compartment, means for introducing a chemical reactant into the lower portion of said upper compartment in contact with said fluidized bed of solid material, means for withdrawing all of said reaction products from said upper compartment, means for passing solid material from the upper compartment to a stripping compartment, means for passing solid material from the regenerator chamber to said stripping compartment, conduit means connecting said stripping compartment with said lower compartment, means for passing solid material from the lower compartment substantially vertically upward to the regenerator chamber, and means for passing solid material from the regenerator substantially vertically downwardly to said upper compartment.

10. A unitary conversion apparatus comprising in combination a lower reaction chamber having an upper regenerator chamber surmounted thereon, a substantially horizontal foraminous partition dividing the reactor chamber into separate upper and lower conversion compartments, means for introducing a chemical reactant into the lower compartment in contact with a fluidized bed of finely divided catalytic material maintained therein, means for passing a chemical reactant in addition to said reaction products from the lower compartment upwardly through a fluidized bed of finely divided catalytic material in said upper compartment, means for withdrawing reaction products from said upper compartment, means for passing catalytic material from the upper conversion compartment to an adjacent stripping compartment, means for passing catalyst material from said stripping compartment to said lower conversion compartment, conduit means for passing catalytic material from the lower conversion compartment substantially vertically upwardly to said regenerator chamber and conduit means for passing catalytic material from the regenerator chamber to said upper conversion and stripping compartments.

11. A unitary vessel comprising in combination a reactor chamber in the lower portion having a regenerator chamber surmounted thereon, a substantially horizontal baffle means dividing the reaction chamber into separate upper and lower conversion compartments, means for separately introducing a chemical reactant into each of said conversion compartments in contact with a fluidized bed of finely divided catalytic material, a substantially vertical conduit means connected to said horizontal baffle means for passing the reaction products from the lower compartment to the upper portion of said upper compartment, conduit means for withdrawing reaction products from the upper compartment, a substantially vertical baffle means extending upwardly from said horizontal baffle means forming a stripping compartment in said upper compartment, means for passing catalytic material from said upper compartment through said vertical baffle means to said stripping compartment, a substantially vertical conduit for passing catalyst downwardly from the regeneration chamber to said stripping compartment, a substantially vertical conduit for passing catalyst downwardly from said stripping compartment to said lower compartment, a substantially vertical conduit for passing catalytic material from the lower portion of said lower compartment upwardly to the lower portion of said regenerator chamber and conduit means for passing catalytic material from the regenerator chamber substantially vertically downwardly to said upper compartment.

References Cited in the file of this patent

UNITED STATES PATENTS

| | | |
|---|---|---|
| 2,367,281 | Johnson | Jan. 16, 1945 |
| 2,416,730 | Arveson | Mar. 4, 1947 |
| 2,429,721 | Jahnig | Oct. 28, 1947 |
| 2,433,726 | Angell | Dec. 30, 1947 |
| 2,461,958 | Bonnell | Feb. 15, 1949 |
| 2,488,032 | Johnson | Nov. 15, 1949 |